May 8, 1945.  A. H. WICKHAM  2,375,602
GEAR CHANGING MECHANISM
Filed Nov. 6, 1942  3 Sheets-Sheet 1
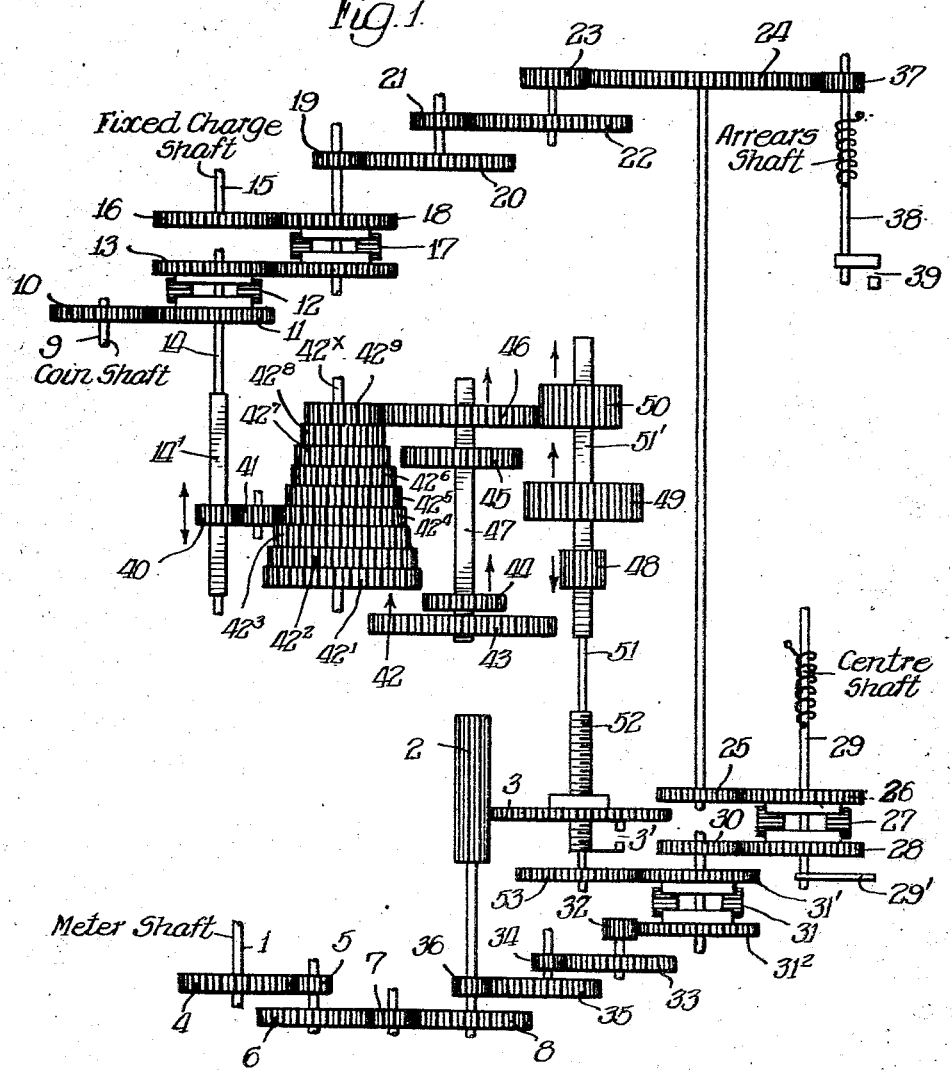
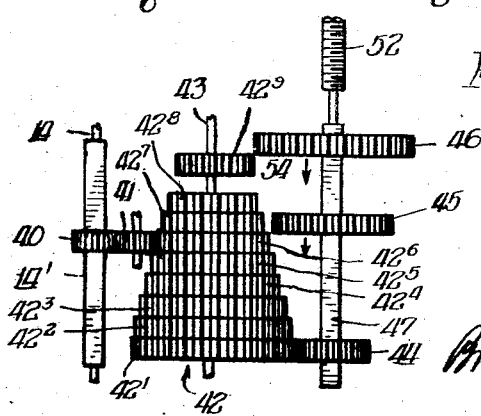
INVENTOR.
Alfred H. Wickham.

INVENTOR.
Alfred H. Wickham,

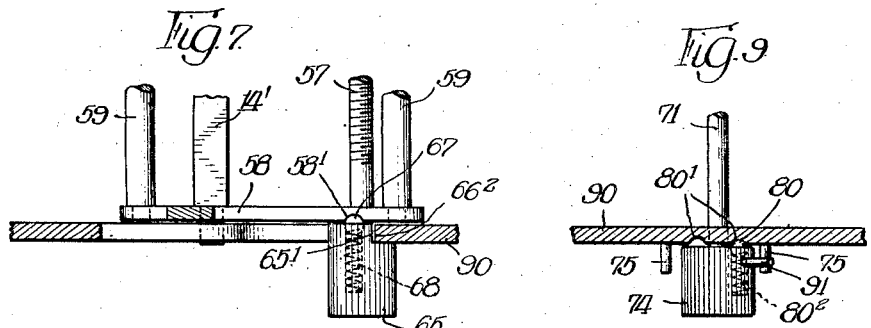
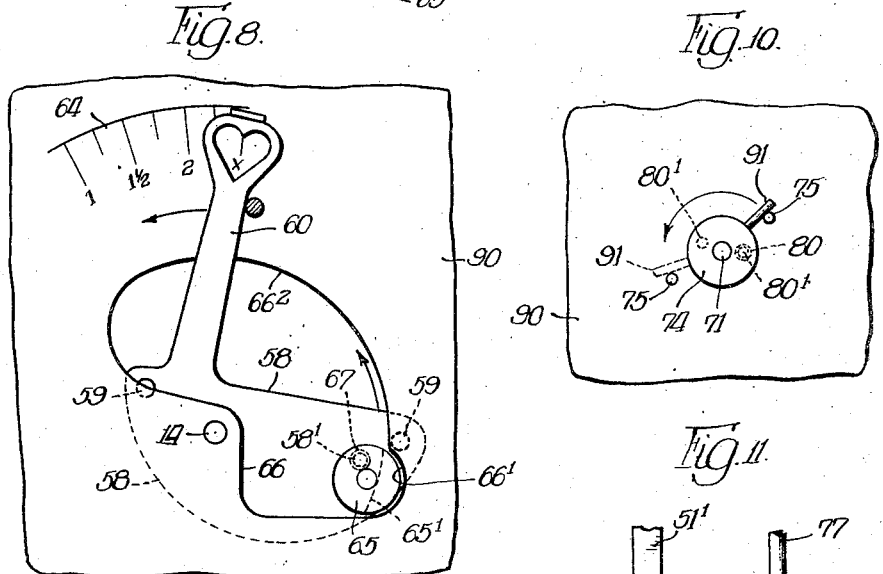
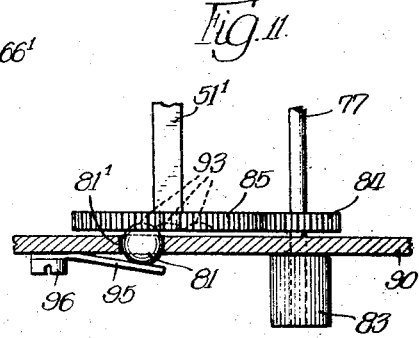
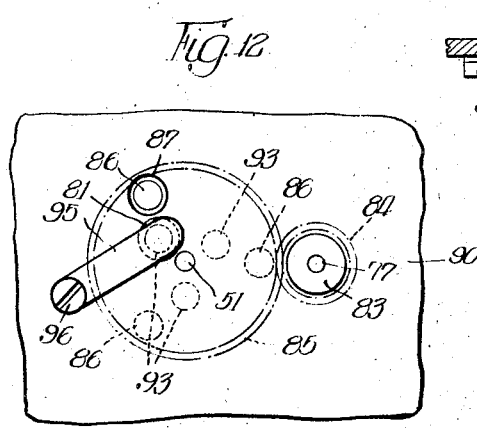

Patented May 8, 1945

2,375,602

UNITED STATES PATENT OFFICE 2,375,602

GEAR CHANGING MECHANISM

Alfred Henry Wickham, Enfield, England, assignor to Sangamo Electric Company, Springfield, Ill.

Application November 6, 1942, Serial No. 464,830
In Great Britain February 21, 1942

9 Claims. (Cl. 74—342)

According to one feature of the invention the multiplier consists of a plurality of wheels adapted to engage directly with wheels mounted upon a shaft of the first gear change device whereby intermediate or idler wheels between the stepped gear and the multiplier are avoided.

According to a further feature of the invention a second multiplier consisting of a plurality of wheels is adapted to engage directly with wheels mounted upon a shaft of either the other multiplier or of the stepped gear.

According to a further feature of the invention a multiplier is employed in conjunction with a stepped gear, the axial movement of the wheels by which the gear change is effected being brought about by the rotation of a spindle engaging with threads on a carriage for the said wheels.

The invention will be best understood in connection with the accompanying drawings in which;

Figure 1 shows schematically the complete gear mechanism of the meter with one embodiment of the price change device;

Figure 6 shows schematically another embodiment of the price change device by way of example.

Figures 7 and 8 illustrate the setting means for the step gear.

Figures 9 and 10 illustrate the setting means for the first multiplier.

Figs. 11 and 12 illustrate the setting means for the second multiplier.

Figure 2:
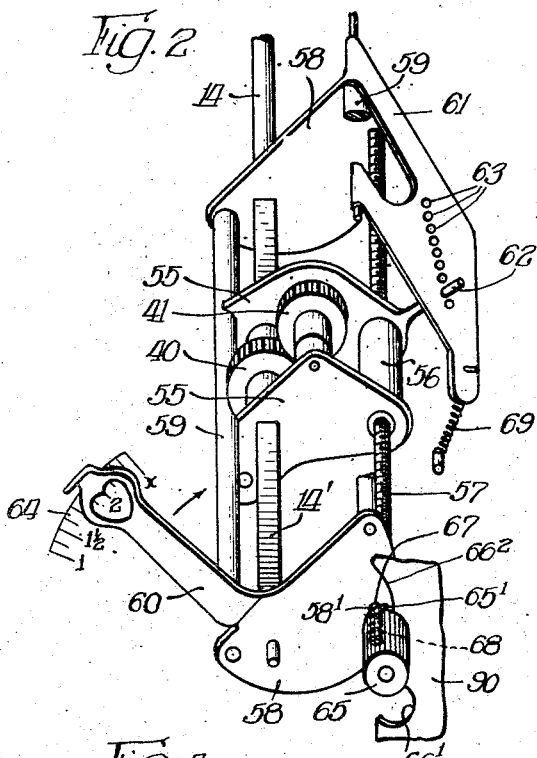
Figures 2 through 5 illustrate the components of the price change device of Figure 1 in perspective.
Figure 3:
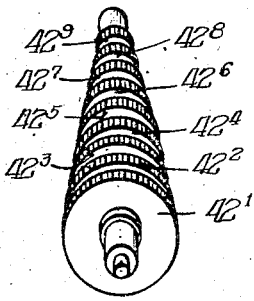

According to Figure 1 the meter shaft 1 drives the trip pinion 2 by means of a gearing 4, 5, 6, 7 and 8. The pinion 2 meshes with the trip wheel 3 whose hub engages the threaded part 52 of the trip shaft 51. The spindle 9 of the coin mechanism, which is not shown, is connected to a shaft 14 of the price change device, hereafter to be described, by a gear wheel 10 and the one sun wheel 11 of a differential gear 12. The spindle 15 of the fixed charge mechanism, also not shown, is linked with the spindle 14 by a gear wheel 16 through differentials 17 and 12. Gear wheels 19, 20, 21, 22, 23, 24 and 25 connect the sun wheel 18 of the differential 17 with the sun wheel 26 of a differential 27 geared to the center staff 28 (29' designates a pointer on the shaft 29). The gear wheel 24 meshes with a pinion 37 keyed to the shaft 38 of the arrears staff. 39 designates the multiple stop actuated by the shaft 38. A gear wheel 36 keyed on the shaft of the trip pinion 2 is linked by gear wheels 32, 33, 34 and 35 with the one sun wheel $31^2$ of a differential 31 whose other sun wheel 31' meshes with a gear wheel 53 keyed on the trip shaft 51 and with the sun wheel 28 of the differential 27 by an intermediate gear wheel 30. 3' designates the switch trip which tends to be opened by the coin-driven shaft and closed by the meter and/or the fixed charge motor when the prepayment has been exhausted.

As so far described the gear mechanism and its function is known as illustrated in my Patent No. 2,271,752.

The price change device arranged between the coin driven shaft 9 and the trip shaft 51 comprises according to the embodiment illustrated in Figure 1 four sets of interengaging gears. One set consists of a gear wheel 40 adapted to slide on a square key portion 14' of the shaft 14 while in permanent engagement with a wheel 41 which moves with it. The wheel 41 is adapted to be set to engage any selected wheel of a set 42 of wheels 42', $42^2$, $42^3$, $42^4$, $42^5$, $42^6$, $42^7$, $42^8$ and $42^9$ of graded sizes and having teeth of the same pitch as wheel 41. The wheels 42 are keyed to a common shaft $42^x$ parallel to the axle of the wheel 41. With this gear change device the gear ratio between shafts 14 and $42^x$ can be varied in finely graded steps.

In order to increase the range of gear ratio another gear change device acting as a multiplier is provided.

In the embodiment illustrated in Figure 1 the multiplier consists of two gear sets in engagement with each other and one of them in direct engagement with selected wheels of the graded wheels 42 although if desired extra wheels mounted on the shaft $42^x$ could be provided for this purpose as will be readily understood. This multiplier set comprises two wheels 44 and 46 adapted, as will be hereinafter set forth, to slide jointly on a square spindle 47 so that either the wheel 44 can be brought to mesh with wheel 42' or the wheel 46 can be brought into mesh with wheel $42^9$. Additional wheels 43 and 45 are also provided on spindle 47 for a purpose to be described hereinafter. The second multiplier set comprises three gear wheels 48, 49 and 50 jointly movable along a square key portion 51' of the trip shaft 51. The wheels 48, 49 and 50 are so arranged with respect to the first multiplier set that selectively wheel 48 can be brought to mesh with wheel 43, or wheel 49 with wheel 45, or wheel 50 with wheel 46. The wheels and adjustability of the second multiplier are so arranged that irrespective of the setting of the first multiplier the same settings of the second multiplier will produce the same result.

It will be understood that, while certain wheels, for instance wheels 42', 42$^9$ and 46, perform a dual function the arrangement can be modified, for instance other wheels may be adapted to serve a dual function while alternatively additional wheels may be provided so that each wheel performs a single function. The order of the multipliers may also be varied and the arrangement of the multipliers with respect to the stepped gear and each other may be varied, for instance wheels may be provided on the shaft 14 for interengaging with the multiplier.

Figures 2 through 5 and Figures 7 through 12 show the mechanism for controlling the various gear changes.

The wheels 40 and 41 are mounted in a cage 55, Figure 2, which is adapted to slide along the square portion 14' of the shaft 14. A nut member 56 of the cage 55 engages a threaded portion of a spindle 57 rotatably mounted in two brackets 58. The brackets 58 are held in spaced relationship with each other by fixed bars 59 and between which the cage 55 moves. The brackets 58 are pivoted on the shaft 14, and by means of a lever 60, attached to one of the brackets, they can be rocked about the shaft 14 together with the spindle 57, the cage 55 and the wheel 41. The cage 55 is normally locked by means of a flap 61, hinged between plates 90 of the meter casing, one of which is indicated in Figure 2. Flap 61 engages with a pin 62 which projects from the cage 55 and is adapted to enter into one of a series of holes 63 in the flap 61. In order to change the engagement between the wheel 41 and the wheel set 42 the flap 61 must be pulled out of engagement with the pin 62 against the force of a spring 69, and the lever 60, as indicated by an arrow in Figure 2, swung in clockwise direction to a mark "X" on a fixed scale 64. This movement brings a knob 65 fastened on the front end of the spindle 57 opposite a semi-circular portion 66$^1$ of a recess 66 provided in the front wall 90 of the meter casing (see Figures 2, 7, and 8). Owing to a step 65$^1$ on the inward end of the knob 65, which engages a portion 66$^2$ of the recess 66 concentric to the axis 14, the position of the knob 65 opposite the recess portion 66$^1$, as shown in Figure 8, is the only position in which the knob 65 and the spindle 57 can be turned to bring the wheel 41 into another meshing position. To ensure that the knob 65 is located in the position permitting the rocking movement of the brackets 58 the knob 65 is provided with a ball 67 and a spring 68 which presses the ball 67 towards the opposite bracket plate 58. This plate has a hole 58$^1$ into which the ball 67 engages when the knob 65 is in the position enabling the rocking movement of the brackets 58. The pitch of the screw thread of the spindle 57 corresponds with the breadth, and an eventual spacing, of the wheels 42$^1$, 42$^2$, etc., 42$^9$, and with the distance of the holes 63 from each other so that on every turn of the knob 65 the wheel 41 sliding with the cage 55 and the wheel 40 along the square portion 14$^1$ of the shaft 14, comes opposite with another wheel of the stepped set 42, each revolution of the knob 65 being registered by the ball 67. When wheel 41 is returned into engagement with the wheel set 42 its new meshing position is indicated by the lever 60 on the scale 64. As in every meshing position of the wheel 41 the pin 62 is in alignment with one of the holes 63 the flap 61 can then be rocked back into its locking position to ensure the engagement of wheel 41 with the selected wheel of set 42.

Figure 4:
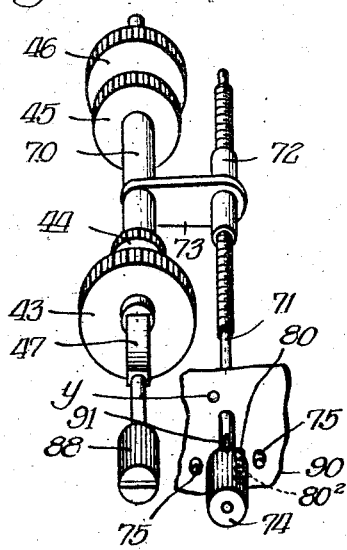

The wheels 44 and 46, Figure 4, of the first multiplier are keyed to a sleeve 70, as are also the wheels 43 and 45, and this assembly is adapted to be moved along the square spindle 47 by means of a threaded spindle 71 and a nut 72 travelling on the threaded part of the spindle 71 and connected to the sleeve 70 by an arm 73. At its front end the spindle 71 is provided with a knob 74 which by half a turn between stops 75, 75 effects the engagement either of wheel 44 with wheel 42', or of wheel 46 with wheel 42$^9$, see Figures 1 and 3. The knob 74 carries a catch-ball 80 and a spring 80$^2$ which urges the ball 80 towards the front wall 90. The wall 90 is provided with two holes 80$^1$ diametrically opposite, which are adapted to detain the ball 80 in each of the two end positions of knob 74 and spindle 71. This movement of the gear wheels 44 and 46 is very slight so that the meshings of the second multiplier are not affected. A knob 88 at the front end of the spindle 47 serves to rotate the wheels of this spindle to ensure meshing when they are slid along the spindle.

Figure 5:
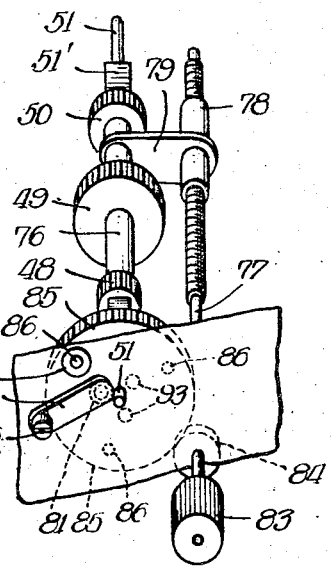

In the same manner as with the first multiplier the wheels 48, 49 and 50 of the second multiplier are attached to a sleeve 76, Figure 5, adapted to be moved along the square portion 51' of the shaft 51 by means of a threaded spindle 77 and a travelling nut 78 connected to the sleeve 76 by an arm 79. An index wheel 85 which is freely rotatable on the shaft 51 is geared with the spindle 77 by a pinion 84, and on turning the spindle 77 by means of a knob 83 either wheel 48 comes into mesh with wheel 43, or wheel 49 with wheel 45, or wheel 50 with wheel 46. Every correct meshing is registered by a ball 81 placed in a hole 81$^1$ of the front wall 90 and pressed by a spring blade 95 which is fastened on the front wall 90 by a screw 96 towards the front of the wheel 85. The wheel 85 is provided with three recesses 93 co-operating with the ball 81, and with three suitably coloured dots 86 so that each correct meshing of the wheels is located by the ball 81 and made visible by the appearance of one of the dots 86 in a window 87 of the front wall 90. The breadth of the wheels 48, 49 and 50 as indicated in Figure 1 is so selected with regard to the breadth of the wheels 43, 45 and 46 that the gear changes between these wheels are not affected by the particular meshing of the wheels 44 or 46 with the corresponding wheels of the set 42.

The axial distance of the wheels of each multiplier set is furthermore so proportioned that before a mesh between two adjacent sets is broken another mesh begins. In this way there is during every gear change an intermediate position where two sets are meshing with each other in a locking sense preventing a loss of credit or arrears through a drive of the springs of the credit or arrears staff. One of these locking positions is marked on the plate 90 behind the knob 74—mark $y$—and a pointer 91 on the knob 74 is to be turned to this position before the flap 61 releasing the cage 55 is operated.

The gear change effect of this device will best be seen from a numerical example.

If, for instance, as illustrated, the set 42 comprises 9 wheels of regularly stepped sizes and the diameter of the smallest wheel (42$^9$) is half the diameter of the largest wheel (42') eight ⅛ speed steps ranging from 1 to 2 can be geared with this device. If the wheels 50, 46 and 42⁹ have 40, 80 and 40 teeth respectively this gives a gear ratio of 1 to 1 between shafts 42X and 51 if these wheels are all in engagement. If, however, wheel 45 with 60 teeth engages wheel 49 with 60 teeth then the gear ratio between shafts 42X and 51 if the first multiplier is unchanged becomes 2 to 1. If wheel 43 with 96 teeth engages with wheel 48 with 24 teeth the ratio becomes 1 to 2. If the first multiplier is operated so that wheel 42' with 80 teeth engages with wheel 44 with 40 teeth the above gear ratios change to 4 to 1, 2 to 1 and 8 to 1 respectively.

The following speed changes can thus be obtained: from ¼ in eight 1/32 steps to ½, from ½ in eight 1/16 steps to 1, from 1 in eight ⅛ steps to 2, from 2 in eight ¼ steps to 4 and from 4 in eight ½ steps to 8.

As the number of price ranges that can be effected with the two multiplier sets depends on the number of alternatively meshing wheel pairs, a larger or smaller number of price ranges can be achieved by means of more or less gear wheels in the multiplier sets, or by means of more than two multiplier sets meshing directly with each other in series.

If a small number of price ranges is required, as, for instance, three or four, this result can be achieved with one multiplier set only. This is schematically illustrated by way of example in Figure 6 wherein references like those used in Figures 1 and 2 denote like items.

In the embodiment of Figure 6 the stepped gearing consists like that of Figures 1 through 5 of the gear wheels 40 and 41 and the stepped wheel set 42 comprising gear wheels 42' to 42⁹. The multiplier only comprises one set of wheels 44, 45 and 46 which, by means of a controlling mechanism like that of 70, 71, 72, 73, 74 (illustrated in Figure 4), can selectively be brought to mesh in the following manner: wheel 44 with wheel 42', or wheel 45 with wheel 42⁵, or wheel 46 with wheel 42⁹. All that is needed to ensure a correct meshing of the wheels is to provide a gap between two wheels, for instance gap 54 between the wheels 42⁹ and 42⁸, such gap to exceed the breadth of a wheel such as 46. By providing more of those gaps between the wheels 42 more multiplier wheels on the spindle 47 can accordingly be applied and selectively brought to mesh with a wheel of the set 42.

When the price per unit of the commodity is set at a high rate there is a tendency for the trip not to latch on coins of small value due to low ratio of price change, gear back lash and flexing of spindles and components concerned. To overcome this difficulty a device may be provided by means of which the trip shaft is pushed in the required direction sufficiently far to ensure that latching can take place safely and then releasing it gently to the gear train resistance. This may for instance be achieved with the help of a slide with a blade spring operated by the coin mechanism and engaging a ratchet on the trip shaft on every coin operation and returning to its rest position thereafter, so that the coin mechanism has only to affect the gearing and not to overcome the pressure of the trip mechanism.

I claim as my invention:

1. In gear mechanism for transmitting a variable ratio drive between driving and driven elements, the combination of a stepped gear wheel assembly, a first gear wheel operatively connected with one of said elements and movable axially along said stepped gear wheel assembly, a second gear wheel meshing with said first gear wheel and shiftable axially therewith, means for swinging said second gear wheel laterally into and out of mesh selectively with different gears of said stepped gear wheel assembly, a first multiplier comprising a plurality of gear wheels of different diameters arranged to mesh with selected gear wheels of said gear wheel assembly, and a second multiplier operatively connected with the other of said elements and comprising a plurality of gear wheels of different diameters arranged to mesh with selected gear wheels of said first multiplier, the particular engagements of the various gear wheels being in accordance with the desired driving ratio between said driving and driven elements.

2. In gear mechanism for transmitting a variable ratio drive between driving and driven elements, the combination of a stepped gear wheel assembly, a first gear wheel operatively connected with one of said elements and movable axially along said stepped gear wheel assembly, a second gear wheel meshing with said first gear wheel and shiftable axially therewith, means for swinging said second gear wheel laterally into and out of mesh selectively with different gears of said stepped gear wheel assembly, a multiplier operatively connected with the other of said elements and comprising a plurality of gear wheels of different diameters, a carriage therefor, and a threaded spindle engaging threads on said carriage for moving the gear wheels carried thereby axially to mesh with selected gear wheels of said gear wheel assembly in accordance with the desired driving ratio between said driving and driven elements.

3. In gear mechanism for transmitting a variable ratio drive between driving and driven elements, the combination of a stepped gear wheel assembly operatively connected with one of said elements, a first multiplier comprising a plurality of gear wheels of different diameters, a carriage therefor, a threaded spindle engaging threads on said carriage for moving the gear wheels carried thereby axially to mesh with selected gear wheels of said gear wheel assembly, a second multiplier operatively connected with the other of said elements and comprising a plurality of gear wheels of different diameters, a carriage therefor, and a threaded spindle engaging threads on said carriage for moving the gear wheels carried thereby axially to mesh with selected gear wheels of said first multiplier, the particular engagements of the various gear wheels being in accordance with the desired driving ratio between said driving and driven elements.

4. In gear mechanism for transmitting a variable ratio drive between driving and driven elements, the combination of a stepped gear wheel assembly adapted to be operatively connected with one of said elements, a first multiplier comprising a plurality of gear wheels of different diameters, a carriage therefor, a threaded spindle engaging threads on said carriage for moving the gear wheels carried thereby axially to mesh with selected gear wheels of said gear wheel assembly, means for indicating the position of said spindle to indicate the particular relation between the gear wheels carried thereby and the gear wheels of said gear wheel assembly, a second multiplier adapted to be operatively connected with the other of said elements and comprising a plurality of gear wheels of different diameters, a carriage therefor, a threaded spindle engaging threads on said carriage for moving the gear wheels carried thereby axially to mesh with selected gear wheels of said first multiplier, and means for indicating the position of said spindle to indicate the particular relation between the gear wheels controlled thereby and the gear wheels of said first multiplier, the particular engagements of the various gear wheels being in accordance with the desired driving ratio between said driving and driven elements.

5. In gear mechanism for transmitting a variable ratio drive between driving and driven elements, the combination of a stepped gear wheel assembly adapted to be operatively connected with one of said elements, a first multiplier comprising a plurality of gear wheels of different diameters shiftable along an axis spaced laterally from the axis of said stepped gear wheel assembly and arranged to mesh with selected gear wheels of said gear wheel assembly, a second multiplier adapted to be operatively connected with the other of said elements and comprising a plurality of gear wheels of different diameters shiftable along an axis spaced laterally from the axes of said stepped gear wheel assembly and said first multiplier and arranged to mesh with selected gear wheels of said first multiplier, and means for independently axially moving the gear wheels of each multiplier in accordance with the desired driving ratio between said driving and driven elements.

6. In gear mechanism for transmitting a variable ratio drive between driving and driven elements, the combination of a stepped gear wheel assembly, a first gear wheel operatively connected with one of said elements and movable axially along said stepped gear wheel assembly, a second gear wheel meshing with said first gear wheel and shiftable axially therewith, means for swinging said second gear wheel laterally into and out of mesh selectively with different gears of said stepped gear wheel assembly, a first multiplier comprising a plurality of gear wheels of different diameters arranged to mesh with selected gear wheels of said gear wheel assembly, a second multiplier operatively connected with the other of said elements and comprising a plurality of gear wheels of different diameters arranged to mesh with selected gear wheels of said first multiplier, and means for independently axially moving the gear wheels of each multiplier in accordance with the desired driving ratio between said driving and driven elements, the breadth of the gear wheels of said multipliers being such that a change in the operative position of the gear wheels of one multiplier does not affect the gear change determined by the operative positions of the gear wheels of the other multiplier.

7. In gear mechanism of the class described for transmitting a variable ratio drive between driving and driven elements, the combination of a stepped gear wheel assembly adapted for operative connection with one of said elements, a first multiplier comprising a plurality of gear wheels of different diameters arranged to mesh with selected gear wheels of said gear wheel assembly, a second multiplier adapted for operative connection with the other of said elements and comprising a plurality of gear wheels of different diameters arranged to mesh with selected gear wheels of said first multiplier, and means for independently axially moving the gear wheels of each multiplier in accordance with the desired driving ratio between said driving and driven elements, the axial distances apart of the gear wheels of said multipliers being such that before any of them is moved out of mesh with another gear wheel, another is moved into mesh with a gear wheel whereby, for every gear change, there is an intermediate locking position.

8. In gear mechanism for transmitting a variable ratio drive between driving and driven elements, the combination of a stepped gear wheel assembly operatively connected with one of said elements, a first gear wheel operatively connected with the other of said elements, a second gear wheel meshing with said first gear wheel, a cage carrying said first and second gear wheels and pivoted about the axis of said first gear wheel and movable along said axis and along said stepped gear wheel assembly to place said second gear wheel in mesh with any one of the gear wheels of said stepped gear wheel assembly, a threaded shaft engaging threads on said cage for shifting said cage along the axis of said first gear wheel, and interlocking means for preventing rotation of said threaded shaft until said cage has been swung about said axis to a position separating said second gear wheel from said stepped gear wheel assembly.

9. In gear mechanism for transmitting a variable ratio drive between driving and driven elements, the combination of a stepped gear wheel assembly, a first gear wheel operatively connected with one of said elements and movable axially along said stepped gear wheel assembly, a second gear wheel meshing with said first gear wheel and shiftable axially therewith, a cage carrying said first and second gear wheels and pivoted about the axis of said first gear wheel and movable along said axis and along said stepped gear wheel assembly to place said second gear wheel in lateral registration with any one of the gear wheels of said stepped gear wheel assembly, means for swinging said cage about said axis to swing said second gear wheel into mesh with the selected gear wheel of the stepped gear wheel assembly, a threaded shaft engaging threads on said cage for shifting said cage along said axis of the first gear wheel, a multiplier operatively connected with the other of said elements and comprising a plurality of gear wheels of different diameters shiftable along an axis spaced laterally from the axes of said stepped gear wheel assembly and of said first gear wheel, the gear wheels of said multiplier being arranged to mesh with selected gear wheels of said stepped gear wheel assembly, a carriage for the gear wheels of said multiplier, and a threaded shaft engaging threads on said carriage for shifting the gear wheels of said multiplier into and out of mesh with selected gear wheels of said stepped gear wheel assembly.

ALFRED HENRY WICKHAM.